US011220580B2

(12) United States Patent
Lee

(10) Patent No.: US 11,220,580 B2
(45) Date of Patent: Jan. 11, 2022

(54) METHOD FOR PREPARATION OF BIO-FILLER FOR PLASTIC AND BIO-FILLER FOR PLASTIC PREPARED THEREBY

(71) Applicant: LIGNUM Inc., Daejeon (KR)

(72) Inventor: Sang-Hyun Lee, Daejeon (KR)

(73) Assignee: LIGNUM INC., Daejeon (KR)

(*) Notice: Subject to any disclaimer, the term of this patent is extended or adjusted under 35 U.S.C. 154(b) by 0 days.

(21) Appl. No.: 16/766,091

(22) PCT Filed: Jul. 30, 2018

(86) PCT No.: PCT/KR2018/008609
§ 371 (c)(1),
(2) Date: May 21, 2020

(87) PCT Pub. No.: WO2019/112138
PCT Pub. Date: Jun. 13, 2019

(65) Prior Publication Data
US 2020/0347189 A1  Nov. 5, 2020

(30) Foreign Application Priority Data
Dec. 6, 2017 (KR) .................. 10-2017-0166679

(51) Int. Cl.
| C08H 8/00 | (2010.01) |
| C08L 1/02 | (2006.01) |
| C08L 5/14 | (2006.01) |
| C08L 97/00 | (2006.01) |
| C08L 55/02 | (2006.01) |
| C08L 67/00 | (2006.01) |
| C08L 71/00 | (2006.01) |
| C08L 77/06 | (2006.01) |
| C08L 79/08 | (2006.01) |

(52) U.S. Cl.
CPC .................. *C08H 8/00* (2013.01); *C08L 1/02* (2013.01); *C08L 5/14* (2013.01); *C08L 97/005* (2013.01); *C08L 55/02* (2013.01); *C08L 67/00* (2013.01); *C08L 71/00* (2013.01); *C08L 77/06* (2013.01); *C08L 79/08* (2013.01)

(58) Field of Classification Search
CPC ..................................... C08H 8/00; C08L 1/02
See application file for complete search history.

(56) References Cited

U.S. PATENT DOCUMENTS

| 4,237,226 A * | 12/1980 | Grethlein ................. C12P 19/20 127/29 |
| 4,664,717 A * | 5/1987 | Young .................... A01N 59/02 127/37 |
| 5,486,068 A * | 1/1996 | Wilson ...................... C05F 7/00 405/129.25 |
| 8,247,203 B2 * | 8/2012 | Foody ........................ C01C 1/28 435/163 |
| 2009/0043088 A1 * | 2/2009 | Shimamoto ............ G02B 1/105 536/58 |
| 2015/0041083 A1 * | 2/2015 | Yoshikawa ............ D21H 17/06 162/19 |
| 2016/0145478 A1 * | 5/2016 | Blount ................... C09J 189/00 106/137.6 |
| 2016/0362435 A1 * | 12/2016 | Pandey ................... C13B 20/00 |
| 2017/0044329 A1 * | 2/2017 | Kim .......................... C12P 7/10 |
| 2018/0051414 A1 * | 2/2018 | Rittig ...................... C08B 1/003 |
| 2020/0308765 A1 * | 10/2020 | Laukkanen ............ D21C 9/002 |

FOREIGN PATENT DOCUMENTS

| JP | 2005081640 A | 3/2005 |
| JP | 2007124933 A | 5/2007 |
| JP | 2007306844 A | 11/2007 |
| JP | 2010032274 A | 2/2010 |
| JP | 2017057411 A | 3/2017 |
| KR | 1020120094393 A | 8/2012 |
| KR | 101764692 B1 | 8/2017 |
| KR | 101809564 B1 | 12/2017 |
| WO | WO2016199083 A2 | 12/2016 |
| WO | WO2017217677 A1 | 12/2017 |

OTHER PUBLICATIONS

Mussatto (Biomass Treatment with Acids, Biomass Fractionation Technologies for Lignocellulosic Feedstock Based Biorefinery, Chapter 8, Elsevier Inc., 2016) (Year: 2016).*
Maldhure et al. (Journal of Applied Polymer Science, vol. 125, 1701-1712 (2012)) (Year: 2012).*
International Search Report of PCT/KR2018/008609, dated Nov. 14, 2018, English translation.
Office action from Korean Intellectual Property Office of 10-2017-0166679, dated Dec. 12, 2018.
Furkan H. Isikgor and C. Remzi Becer, Lignocellulosic biomass: a sustainable platform for the production of bio-based chemicals and polymers, Polymer Chemistry, Apr. 29, 2015, vol. 6, pp. 4497-4559, The Royal Society of Chemistry, London, United Kingdom.
The extended European Search report of EP18 88 6325, dated Jul. 26, 2021.
Stefania Angelini et al, Acid-insoluble lignin and holocellulose from a lignocellulosic biowaste: Bio-fillers in poly(3-hydroxybutyrate), European POlymer Journal, Jan. 14, 2016, pp. 63-76, vol. 76, Elsevier, Amsterdam, Netherlands.

* cited by examiner

*Primary Examiner* — Liam J Heincer
(74) *Attorney, Agent, or Firm* — STIP Law Group, LLC

(57) ABSTRACT

Disclosed herein a method for preparing a bio-filler for a plastic from woods and a bio-filler for a plastic prepared thereby.

14 Claims, No Drawings

METHOD FOR PREPARATION OF BIO-FILLER FOR PLASTIC AND BIO-FILLER FOR PLASTIC PREPARED THEREBY

CROSS-REFERENCE TO RELATED APPLICATIONS

This application is the U.S. National Phase under 35 U.S.C. § 371 of International Application No. PCT/KR2018/008609 filed on Jul. 30, 2018, which in turn claims the benefit of Korean Application No. 10-2017-0166679, filed on Dec. 6, 2017, the disclosures of which are incorporated by reference into the present application.

TECHNICAL FIELD

The present disclosure pertains to a method for preparing from lignocellulosic biomass a bio-filler for plastics and to a bio-filler for plastics prepared thereby.

BACKGROUND ART

With the emergence of global warming and environmental pollution, much attention is paid to biomaterials that can substitute for petroleum-based materials. Among others, plastics, which are for the most part derived from petroleum, are extensively applied to automobile interiors, construction materials, packaging materials, etc. These materials generate a large amount of carbon dioxide and pollutants when incinerated after disposal. In order to fundamentally solve such a problem, technologies associated with bio-plastic materials have attracted much attention.

Generally, there are three types of materials that are available for manufacturing plastic products. First mentioned are base resin materials for use in plastic products, such as polyethylene (PE), polypropylene (PP), polyvinylchloride (PVC), polystyrene, and so on, followed by additives for providing additional functions such as colors, oxidation resistance, UV stability, etc. Finally, fillers are used to improve plastic properties, such as strength, etc. The three materials are properly compounded to afford a resin compound which is injected or extruded into desired plastic products.

Thus far, there have been many reports on bio-plastic material production as well as research on the substitution of bio-materials for plastic product materials. Among other things, extensive studies have been carried out on technologies utilizing nonedible lignocellulosic biomass as raw materials. On the whole, such lignocellulosic biomass-utilizing techniques are divided into three groups as follows. First, lignocellulosic biomass is finely pulverized and mixed with conventional petroleum resins before preparation into plastics. In this case, poor compatibility between lignocellulosic biomass and resins results in deteriorated physical properties in the final products. Proposed in order to solve the problem is a technique in which lignocellulosic biomass is simply subjected to thermal treatment in an anaerobic condition (torrefaction), finely pulverized, and mixed with conventional petroleum plastics to produce bio-fillers. However, the technique has not yet been commercialized so far because of limited physical properties of the plastics thus obtained.

In the second group of techniques, lignin is highly purified from lignocellulosic biomass and thermochemically treated. The resulting lignin is used as a filler in plastics. However, the lignin incurs phase separation or undergoes pyrolysis upon compounding with base resins such as polyethylene (PE), polypropylene (PP), or polyvinylchloride (PVC) due to the intrinsic brittleness and hydrophilicity thereof. In addition, lignin can be obtained only at very low yield because its content is not only as low as 10-30% of biomass, but also is reduced during the purification process.

The third group utilizing lignocellulosic biomass as raw material is a technique in which cellulose purified from lignocellulosic biomass is alkylated and used in producing bioplastic materials. Eastman Chemical Company produced products from such bio-plastic materials. However, the technique is used for specialized products because the high cost of the material and processes prevents the wide acceptance of the products.

Lignocellulosic biomass has the advantages of being able to remarkably reduce the emission of greenhouse gas such as carbon dioxide as well as being widely available and very cheap. Despite these advantages, lignocellulosic biomass has not yet been developed into bioplastic materials which can be incorporated into conventional petroleum-based plastics and are price competitive while exhibiting excellent physical properties for the various reasons mentioned above. Therefore, there is an urgent need for the development of a general purpose bioplastic material based on nonedible lignocellulosic biomass.

Manufacturing techniques for such bio-fillers have been developed. For example, Korean Patent No. 10-2012-0094393 A (Aug. 24, 2012) discloses a method for manufacturing lignocellulosic fillers for use in papermaking, in which wood flour is bleached with sodium hydroxide, sodium hypochlorite, chlorine dioxide, or hydrogen peroxide, and then surface modified by mixing an inorganic filler therewith and adding a polymer electrolyte as a binder thereto. Korean Patent No. 10-1764692 (Jul. 28, 2017) pertains to bioplastic comprising a cellulose-containing biomass filler. In detail, a manufacturing technique is described for a biomass filler modified with a covalent bond between the alcohol group contained in the biomass and the carbonyl carbon contained in vegetable oil in order to increase interfacial bonding force between the biomass filler and the plastic matrix.

Conventional petroleum plastics employ a fine powder of minerals such as talc as a filler in order to improve mechanical and chemical properties. However, when used in a large amount, mineral-derived fillers increase the weight of the plastic because of the high specific gravity thereof. Particularly, much attention is paid to developing light-weight materials for automotiles so as to improve fuel efficiency and decrease emissions by substituting plastic fillers with other types of light filler materials and reduce the amount of mineral-based fillers. In addition, in response to the expansion of the market of electric cars, which will have a key part in future automobiles, a rapid progress has been made of research into lightweighting materials for offsetting vehicle battery weights. In this regard, there is an increasing demand for bio-fillers that can be manufactured in a simple process and show low specific gravity and light weight as well as have desirable properties suitable for eco-friendly bioplastic materials.

DISCLOSURE

Technical Problem

A purpose of the present invention is to provide a method for preparing a bio-filler for use in plastics directly from non-edible lignocellulosic biomass at high yield without complicate processes.

Another purpose of the present invention is to provide a light-weight, eco-friendly plastic material comprising the bio-filler prepared according to the preparation method.

Technical Solution

In order to achieve the purposes, the present invention provides a method for preparing a bio-filler for a plastic, the method comprising the steps of: (a) pulverizing and drying lignocellulosic biomass; (b) adding a strong acid to the pulverized and dried lignocellulosic biomass; (c) adding a base to the reaction mixture obtained in step (b) to neutralize the residual acid; and (d) removing water-soluble substance from the reaction mixture neutralized in step (c) to obtain a solid particle.

In an embodiment, the strong acid in step (b) may be sulfuric acid, chloric acid, or a mixture thereof.

In an embodiment, the strong acid in step (b) may be sulfuric acid having a concentration of 50 to 90% (v/v).

In an embodiment, the lignocellulosic biomass in step (a) may comprise lignin and at least one of cellulose and hemicellulose.

In an embodiment, the pulverizing in step (a) may be carried out to pulverize the lignocellulosic biomass to a size of 20 mm or less and the drying in step (a) is carried out to dry the lignocellulosic biomass to a moisture content of 30% by weight or less.

In an embodiment, the base in step (c) may be selected from sodium hydroxide (NaOH), potassium hydroxide (KOH), calcium hydroxide ($Ca(OH)_2$) ammonia ($NH_3$), lithium hydroxide (LiOH), calcium carbonate ($CaCO_3$), potassium carbonate ($K_2CO_3$), sodium carbonate ($Na_2CO_3$), potassium hydrogen carbonate ($KHCO_3$), sodium hydrogen carbonate ($NaHCO_3$), and a combination thereof.

In an embodiment, the removal of water-soluble substance in step (d) may be carried out by a washing process using an aqueous solution.

In an embodiment, the method may further comprise step (e) of pulverizing the solid particle, after step (d).

In an embodiment, the method may further comprise, subsequent to step (d), step (f) of alkylating the solid particles in step (d) or the pulverized solid particle in step (e) at unreacted hydroxyl and carboxyl groups thereof in order to increase hydrophobicity of the particle or substance.

In an embodiment, the pulverization in step (e) may be carried out to finely pulverize the solid particle to an average size of 0.1-100 μm.

In an embodiment, the bio-filler prepared from lignocellulosic biomass may be obtained from lignocellulosic biomass at a yield of 55% or more.

In addition, the present disclosure provides a bio-filler for a plastic, prepared by the method, and a plastic material containing the bio-filler for a plastic.

In an embodiment, the bio-filler may be contained in an amount of 0.1 to 60% by weight, based on the total weight of the plastic.

Advantageous Effects

According to the present disclosure, chemical treatment of cheap nonedible lignocellulosic biomass under a specific condition advantageously allows the direct production of a bio-filler for plastics from lignocellulosic biomass at high yield, without complex processes of isolating lignin or cellulose.

In addition, composite plastic products employing the bio-filler prepared from lignocellulosic biomass according to the present disclosure are remarkably light, compared to those employing mineral-based fillers such as talc. Moreover, composite plastic materials employing the bio-filler prepared from lignocellulosic biomass according to the present disclosure are as good in mechanical and chemical properties as conventional plastics employing mineral-based fillers. In addition to employing cheap biomaterials, the plastic materials according to the present disclosure are advantageously applicable to products requiring light weights, such as automobile interior materials, construction materials, packaging materials, etc.

Furthermore, prepared from lignocellulose biomass of plants according to the present disclosure, the bio-filler for plastics can be completely combusted upon incineration, in contrast to mineral-based substances. Thus, the bio-filler of the present disclosure is convenient and easy to treat and is very advantageous in terms of eco-friendliness.

BEST MODE

A method for preparation of a bio-filler for use in plastics according to the present disclosure may comprise the steps of: (a) pulverizing and drying lignocellulosic biomass; (b) adding a strong acid to the pulverized and dried lignocellulosic biomass; (c) adding a base to the reaction mixture obtained in step (b) to neutralize residual acid; and (d) removing at least part of a water-soluble material from the reaction mixture neutralized in step (c) to afford solid particles.

The lignocellulosic biomass in step (a) contains lignin and at least one of cellulose and hemicellulose. Herbaceous biomass, woody biomass (typical woods) such as conifer and deciduous trees, and rice straw, corn stover, palm bark, sugar cane fall within the scope of the lignocellulosic biomass.

The lignocellulosic biomass is preferably pulverized into particles having a size of 20 mm or less and more preferably a size of 0.001 to 10 mm. This size range is advantageous in that the bio-filler increases in hydrophobicity and thus improves physical properties of the plastics prepared from basic resins in mixture therewith. In detail, when lignocellulosic biomass exists in smaller particle sizes, hydroxyl (—OH) and carboxyl (—COOH) groups present in the biomass more easily undergo dehydration and decarboxylation reactions with acid, resulting in the increased hydrophobicity. Hence, interfacial adhesion between the basic resin and the filler increases, resulting in an improvement in physical properties of the plastics.

After pulverization of the lignocellulosic biomass into a size of 20 mm or less, a drying process may be conducted to reduce a moisture content in the biomass. Through the drying process, the moisture content in the lignocellulosic biomass is reduced to 30% by weight or less, preferably to 20% by weight or less, and more preferably to 10% by weight or less. So long as it reduces a moisture content of lignocellulosic biomass, any drying process such as oven drying, natural drying in an airy place, hot-air drying, etc. may be employed without limitations.

In the present disclosure, the pulverizing and drying step may be carried out irrespective of the sequence thereof. That is, a drying process may be subsequent to a pulverizing process and vice versa. The sequence of processes may be determined according to environmental conditions or the kind or dryness of the lignocellulosic biomass. For example, when the lignocellulosic biomass is in a well dried state, the drying process may be omitted. It is advantageous in terms of efficiency to dry the lignocellulosic biomass that becomes large in surface area after pulverization.

Meanwhile, step (b) of adding a strong acid to the pulverized and dried lignocellulosic biomass accounts for a technical feature of the present disclosure. In some embodiments, sulfuric acid, chloric acid, or a mixture thereof may be used. In a more specific embodiment, sulfuric acid having a concentration of 50 to 90% (v/v) may be used.

Here, for example, 75% (v/v) sulfuric acid may be added at a weight ratio of 1:9 to 9:1, based on the weight of the pulverized biomass, preferably at a weight ratio of 1:5 to 5:1, and more preferably at a weight ratio of 1:1 to 1:2. The ratio may vary depending on optimal conditions taking into accounts kinds of the biomass. A similar mole number within the range may be calculated for chloric acid when it is used. For a mixture of sulfuric acid and hydrochloric acid, their relative amount may be determined on the basis of the above range.

By adding a strong acid, the molecular structure of the cellulose/hemicellulose/lignin composite in lignocellulosic biomass is altered. In this regard, many hydroxyl groups (—OH) and carboxyl groups (—COOH) present in the composite undergo dehydration and decarboxylation reactions with the strong acid, respectively, which results in hydrophobization of the biomass. In addition, the treatment with an acid may induce a polycondensation reaction. In greater detail, a strong acid such as chloric acid, sulfuric acid, etc. is added to the pulverized lignocellulosic biomass while physically stirring, to destroy the molecular structure of the biomass. Of the constituents of lignocellulosic biomass, hydrophilic cellulose and hemicellulose are partially liquefied and liquefied mass is removed. Alternatively, the strong acid induces hydrophobization of cellulose/hemicellulose/lignin molecules through a dehydration reaction with hydroxyl groups (—OH) and a decarboxylation reaction with carboxyl groups (—COOH) in the cellulose/hemicellulose/lignin molecule. Simultaneously, various functional groups of many molecules in the lignocellulosic biomass undergo condensation/polymerization reactions such solid particles of polymers having very complex structures can be formed.

When acid is added, temperature may be set in the range of 30-120° C. and preferably in the range of 70-100° C. The reaction may be carried out for 10 minutes to 12 hours.

In the present disclosure, step (c) of adding a base to the reaction mixture obtained in step (b) to neutralize residual acid is established to solve the problem caused when the strong acid remains unremoved.

The base to be used for the neutralization is selected from sodium hydroxide (NaOH), potassium hydroxide (KOH), calcium hydroxide (Ca(OH)$_2$) ammonia (NH$_3$), lithium hydroxide (LiOH), calcium carbonate (CaCO$_3$), potassium carbonate (K$_2$CO$_3$), sodium carbonate (Na$_2$CO$_3$), potassium hydrogen carbonate (KHCO$_3$), sodium hydrogen carbonate (NaHCO$_3$), and a combination thereof and neutralizes the residual acid in the reaction mixture.

In this regard, the method may further comprise a step of adding water the reaction mixture resulting from the reaction of the strong acid with the lignocellulosic biomass to wash out the residual acid from the reaction mixture, between steps (b) and (c). The strong acid washed out may be recovered and reused.

In the method for preparing a bio-filler for use in plastics according to the present disclosure, step (d) is provided for removing at least part of a water-soluble material from the reaction mixture neutralized in step (c) to afford solid particles. Here, the water-soluble material, which refers to a component dissoluble in aqueous solutions, corresponds to one of the water-soluble components from lignocellulosic biomass after the acid treatment, an unremoved acid component from the strong acid added, and a base component from the base added.

Removal of such water-soluble materials may be achieved by, for example, a washing process using an aqueous solution. In detail, the solid substance obtained after the step (c) of neutralization is washed with an aqueous solution to remove water-soluble salts from the acid and base ingredients added and parts of hydrolyzed saccharides from lignocellulosic biomass. In step (d), as a result, the solid particles may be obtained as a solid substance of modified lignocellulosic biomass in an amount of 30% by weight or more relative to the dry weight of the biomass fed, except for a predetermined amount of the polysaccharides hydrolyzed by the strong acid.

The method according to the present disclosure may further comprises step (e) of pulverizing the solid particles subsequent to step (d). Here, step (e) is to prepare a filler for plastics into a powder form that exhibits better dispersibility and improved compatibility with additives and is easy to handle. In step (e), the solid particles are finely pulverized into powders having an average particle diameter of 0.1-100 μm. In step (e), for example, the solid substance deprived of water-soluble matter by washing, etc. is dried to the degree of 5 weight % or less of moisture and finely pulverized into powder having an average size of 0.1-100 μm to prepare a bio-filler according to the present disclosure.

In the present disclosure, an additional step may be conducted to increase the hydrophobicity of the solid substance obtained in step (d) or step (e), subsequent to step (d) or step (e). In greater detail, the method may further comprise step (f) of alkylating solid particles or solid substance at unreacted hydroxyl and carboxyl groups thereof, subsequent to step (e).

In the step, the solid particle of step (d) or the pulverized solid substance of step (e) is treated with an alkylating agent to alkylate unreacted hydroxyl and carboxyl groups, thereby increasing the hydrophobicity of the bio-filler thus obtained. The bio-filler obtained after step (f) is provided with improved hydrophobicity and thus becomes more compatible with plastics, thereby bringing about an improvement in physical properties of the composite plastics added therewith.

Examples of the alkylating agent used in the step include methylating agents such as methyl chloride, dimethyl sulfate, methyl iodide, dimethyl carbonate, and the like, and ethylating agents such as ethyl chloride, diethyl sulfate, ethyl iodide, and the like, but are not limited thereto.

Meanwhile, a reaction temperature for alkylation with an alkylating agent such as dimethyl carbonate, etc. may be maintained particularly in the range of 100 to 180° C. and more particularly in the range of 120 to 150° C. in view of reaction control. The duration of alkylation reaction range from 1 to 24 hours and particularly from 7 to 15 hours.

The bio-filler prepared according to the method of the present disclosure is a result of various reactions with strong acid, such as dehydration/decarboxylation/condensation/polymerization, etc. and amounts to a composite mixture of oligomers and polymers, but not to a single compound. When used as a filler for plastics, the bio-filler of the present disclosure guarantees the manufacture of plastic materials that have improved physical properties and are light, at low cost.

In addition, having higher hydrophobicity than bio-fillers prepared by simply finely pulverizing general lignocellulosic biomass, the bio-filler of the present disclosure exhibits improved biocompatibility with plastics such as polyolefins (polyethylene (PE), polypropylene (PP), polyvinylchloride (PVC), polystyrene (PS), etc.) and can provide improved mechanical properties for the plastics.

In general, lignocellulosic biomass is known to contain cellulose/hemicellulose and lignin at a mass ratio of about 70% and 30%, respectively, which may vary depending on the kind of the lignocellulosic biomass. Thus, conventional methods for producing fillers for plastics by highly purifying cellulose or lignin from lignocellulosic biomass has theoretical yields of up to 70% and 30%, respectively. In consideration of additional processes, the yields are remarkably reduced below the theoretical values. Furthermore, an increase in purification cost makes the process economically unfavorable.

However, the bio-filler obtained from lignocellulosic biomass by treatment with a strong acid according to the present disclosure can be produced at 30% or higher. The bio-filler prepared according to the present disclosure is characterized by undergoing no changes in physical properties at a production yield of 55% or less. In an aspect of economic benefit, bio-fillers are preferably prepared from woods at a yield of 55% or less.

In addition, the present disclosure provides a bio-filler for plastics, prepared by the method, and a plastic material containing the same. The plastic composite material containing the bio-filler of the present disclosure retains physical properties of the petroleum plastic employed and thus commercially very valuable.

Typically, isolated cellulose or lignin is of poor general purpose because its hydrophilicity causes many problems upon compounding with plastics. However, the bio-filler for plastics according to the present disclosure becomes hydrophobic through strong acid treatment and neutralization and thus is compatible with general-purpose plastics and easy to handle, together. In addition, lignocellulosic biomass is directly used as a material per se upon treatment with acid, without separately isolating and purifying cellulose or lignin, thereby preparing a bio-filler more simply and economically compared to conventional methods.

Typically, the plastic materials or products may vary in physical properties, depending on contents of bio-fillers therein.

The bio-filler for plastics according to the present disclosure may be added in an amount of 0.1 to 60% by weight, based on the total weight of the plastic, particularly in an amount of 1 to 30% by weight, and more particularly in an amount of 2 to 10% by weight.

For example, 0.1 to 30% by weight of a powder of the bio-filler prepared according to the present disclosure and other additives may mixed with a petroleum base resin such as PP, PE, PVC, and the like to afford a composite resin which may be then injected/extruded into plastics and products. In addition, the plastic composite may further contains various additives such as an antioxidant agent, a colorant, a releasing agent, a lubricant, a photostabilizer, a rubber, etc. Contents of these additives may be properly adjusted depending on various factors including final uses and characteristics of the plastic substances.

A better understanding of the present invention may be obtained through the following examples which are set forth to illustrate, but are not to be construed as limiting the present invention.

Example 1

1. Hydrophobization of Lignocellulosic Biomass

Domestic deciduous and conifer trees such as pine, fir, oak, and acacia trees, etc. and Indonesian palm fruit by-products (empty fruit bunches) were used as sources of lignocellulosic biomass to be hydrophobized. These sources were dried to a moisture content of about 10% by weight and mixed with each other at the same weight ratios before pulverization to particles having an average size of 10 mm.

The pulverized biomass and 75% (v/v) sulfuric acid were mixed at a weight ratio of 1:1.0-1.3 at 70-80° C. for 20 min during which a predetermined volume was sampled every 5-10 min from the reaction mixture. The samples were washed twice with water, filtered, neutralized into a pH of 7.0 with a 10 N potassium hydroxide solution, and washed again with a washing fluid to give a solid substance. The washed solid substance was dried at 120° C. for 16 hours in a drier. Production yields of the solid substances were measured in the following Table 1. The solid substance was pulverized into particles having a size of 1.0-50 μm and used as a bio-filler.

2. Methylation of Bio-Filler

The bio-filler prepared above was finely pulverized into a size of 10 μm or less and then added in an amount of 50 g, together with 150 g of dimethyl carbonate (DMC) and 10 g of sodium hydroxide (NaOH), to 1 L of dimethyl sulfoxide (DMOS), followed by reaction at 150° C. for 15 hours. Thereafter, the reaction mixture was filtered while slowly adding 35% hydrochloric acid thereto. The filtrate was sufficiently washed with diluted 0.1 N potassium hydroxide and then with water before being enough dried at 95° C. for 24 hours in a drier. As for methyl transfer, the solid substance thus recovered were found to be methylated at as much as about 90% of the hydroxyl groups thereon as measured by $^{31}P$ NMR. Therefore, it was discovered that the filler prepared through the hydrophobization of lignocellulosic biomass can be further improved in terms of hydrophobicity by methylation.

3. Manufacture of Plastic Resin

In addition, the fillers (not methylated) were tested for effect on physical properties of plastics. To this end, plastic resins containing the fillers (PP composite resins) were manufactured.

PP composite resins were manufactured by compounding 88.5% by weight of PP (HT340, Hyundai, EP), 5% by weight of each of the fillers, 5% by weight of a UV stabilizer, 1% by weight of a heat stabilizer, and 0.5% by weight of an antioxidant agent and were each prepared into test specimens. The PP plastics containing the fillers prepared according to times of acid treatment were measured for tensile strength (ASTM D638), flexural modulus (ASTM D790), IZOD impact strength (ASTM D356 at 23° C.), and specific gravity (ASTM D792) and the measurements are given in Table 1, below.

For comparison of properties, a PP composite resin manufactured by mixing 93.5% by weight of PP (HT340, Hyundai EP), 5% by weight of a UV stabilizer, 1.5% by weight of a heat stabilizer was used as control.

TABLE 1

| Rxn. time | Yield (%) | Tensile Strength (MPa) | Flexural Modulus (MPa) | IZOD Impact Strength (J/m) | Specific Gravity (g/cm$^3$) |
|---|---|---|---|---|---|
| 5 min | 76 | 26 | 2100 | 30 | 0.99 |
| 10 min | 55 | 30 | 2170 | 43 | 0.98 |
| 20 min | 32 | 31 | 2180 | 43 | 0.98 |
| Control | — | 31 | 2410 | 44 | 1.05 |

<Production Yield According to Time of Acid Treatment and Physical Properties of PP Plastics Containing Individual Fillers>

In Table 1, it was shown that production yield of the solid particles decreased with the increase of time of the acid treatment. It is considered that a larger amount of cellulose and hemicellulose was hydrolyzed for a longer reaction time to form more mono- or oligosaccharides which were washed out in the washing process, resulting in a less production yield.

However, as can be seen in Table 1, a longer reaction time for dehydration, decarboxylation, condensation, and polymerization made the filler more hydrophobic, bringing about a greater improvement in the physical properties of the plastic. As the reaction time increased, the production yield of the solid substance was remarkably reduced, but the physical properties remained unchanged at the yield of 55% or less. From the data, it was identified that a hydrophobization condition for a yield of about 55% was optimal.

<Example 2> Thermochemical Analysis of Filler-Containing PP Plastic

The filler prepared through reaction with a strong acid for 20 min in Example 1 and a PP plastic containing 5% by weight of the filler were analyzed for thermochemical properties. To this end, thermogravimetric analysis and differential scanning calorimeter (DSC) analysis were conducted. First, the filler according to the present disclosure was found to undergo pyrolysis at 300-1000° C. (10° C./min, $N_2$) as measured by thermogravimetry.

TABLE 2

| Material | Glass Transition Temp. (Tg), ° C. | Melting Temp. (Tm), ° C. | Time of Oxidative Induction (TOI), min |
|---|---|---|---|
| PP (Control) | −18 | 175 | 2.59 |
| PP containing 5 wt % filler | −12 | 179 | 3.22 |

<Thermochemical Analysis of Filler-Containing PP Plastic>

Materials with high transition temperatures (Tg) are of high heat resistance. As shown in Table 2, the plastic containing the filler exhibited a slightly higher Tg than the control PP. And the following engineering plastics containing the filler exhibited a slightly higher Tg than the control plastics in Table 6. Thus, composite plastics containing the filler are expected to improve heat resistance of conventional general-use and engineering plastics. Indeed, when containing the filler, PP exhibited improved thermal properties, that is, Tg and melting temperatures (Tm), as shown in Table 2.

The bio-filler according to the present disclosure comprises a modified ingredient of lignin, which is a main component of biomass. In general, a polyphenol such as lignin is known as an antioxidant material. Thus, a PP plastic containing the filler was evaluated for oxidation stability (time of oxidative induction) by DSC. In fact, as shown in Table 2, the time of oxidative induction was prolonged, indicating that the PP composite resin containing the filler had increased anti-oxidation.

<Example 3> Influence of Particle Size of Filler on Physical Property of PP Plastic The bio-fillers prepared through reaction with a strong acid for 20 min in Example 1 were fractionated by particle size and used in the amounts as set forth in Example 1 to prepare PP composite resins which were then measured for physical properties. The physical properties of plastics according to particle sizes of the filler are summarized in Table 3, below.

TABLE 3

| Test Item | Unit | Average Particle Size of Filler (μm) | | | | |
|---|---|---|---|---|---|---|
| | | Control | <10 | 10-50 | 50-100 | >100 |
| Tensile Strength | Mpa | 31 | 31 | 30 | 29 | 28 |
| Flexural Modulus | Mpa | 2410 | 2225 | 2180 | 2170 | 2170 |
| IZOD Impact Strength | J/m | 44 | 44 | 43 | 43 | 41 |
| Specific Gravity | g/cm³ | 1.05 | 0.99 | 0.98 | 0.98 | 0.98 |

<Physical Properties of PP Plastic by Particle Size of Filler>

As shown in Table 3, smaller particle sizes of the filler guaranteed better tensile strength and impact strength and larger elastic modulus.

<Example 4> Change of Physical Properties of PP Plastic with Content of Filler

PP composite resin plastic specimens were manufactured in the same manner as in Example 1 with the exception that the filler prepared through reaction with the strong acid for 20 min in Example 1 were used at the contents indicated in Table 4. The plastic specimens were measured for physical properties. In the plastic specimens, contents of PP (HT340, Hyundai EP) were reduced by the weight % of the increased contents of the filler.

TABLE 4

| Test Item | Unit | Filler Content (wt %) | | | |
|---|---|---|---|---|---|
| | | 0 | 5 | 10 | 30 |
| Tensile Strength | Mpa | 31 | 31 | 30 | 29 |
| Flexural Modulus | Mpa | 2410 | 2180 | 2150 | 2100 |
| IZOD Impact Strength | J/m | 44 | 43 | 41 | 37 |
| Specific Gravity | g/cm³ | 1.05 | 0.98 | 0.93 | 0.80 |

<Physical Properties of Plastic by Content of Filler>

As shown in Table 4, the plastic did not change in physical properties at a filler content of up to 5%, but decreased in tensile strength by about 3% and in impact strength by about 7% at a filler content of 10% or greater. When the content of the filler increased, the plastic was observed to slightly decrease in physical properties. However, a higher content of the filler gave a lower specific gravity of the composite resin, thus resulting in a light weight. Hence, the filler can be effectively used in manufacturing plastics for light weights, such as plastics floating on water or interior plastic materials of vehicles.

<Example 5> Change in Physical Properties of Filler-Containing PE and PVC Plastics The fillers prepared through reaction with the strong acid for 20 min in Example 1 were fractionated by size. A PE or PVC composite resin was manufactured by compounding 88.5% by weight of HDPE (LUTENE-H ME8000, LG Chem) or PVC (LG Chem, LS080S), 5% by weight of the filler particles a size of 50 μm or less, % by weight of a UV stabilizer, 1% by weight of a heat stabilizer, and 0.5% by weight of an anti-oxidant agent and prepared into test specimens. They were measured for tensile strength, flexural modulus, IZOD impact strength (a 23° C.), and specific gravity in the same manner as in Example 1. The measurements are summarized in Table 5, below.

TABLE 5

| Test Item | Unit | HDPE Plastic | | PVC Plastic | |
| --- | --- | --- | --- | --- | --- |
| | | Control | Test | Control | 10-50 |
| Tensile Strength | Mpa | 28 | 27 | 50 | 49 |
| Flexural Modulus | Mpa | 1030 | 1010 | 2750 | 2590 |
| IZOD Impact Strength | J/m | 48 | 47 | 35 | 34 |
| Specific Gravity | g/cm$^3$ | 0.957 | 0.91 | 1.40 | 1.35 |

<Physical Properties of Filler-Containing HDPE and PVC Plastics>

As seen in Table 5, the filler-containing plastics were lightened by about 5% while retaining mechanical properties.

<Example 6> Change in Physical Properties of Engineering Plastics Containing Filler (5% by Weight)

The fillers prepared through reaction with the strong acid for 20 min in Experimental Example 1 were fractionated by size. Composite resins were manufactured by compounding 5% by weight of the filler particles with a size of 50 μm or less and 95% by weight of engineering plastic base resin (PEEK; polyether ether ketone (Solvey KetaSpire®), PEI; polyetherimide (Sabic ULTEM), ABS; Acrylonitrile-Butadiene-strene (LG Chem), PA6; polyamide6 (Kolon Plastic), PET; polyethyleneterephthalate (Honam Petroleum and Chemistry)) and prepared into test specimens. They were measured for tensile strength, tensile elongation, specific gravity, and DSC thermochemical changes (Tg and Tm). The measurements are summarized in Table 6, below.

TABLE 6

| Plastic | Unit | Tensile Strength (ISO 527) MPa | Tensile Elongation (ISO 527) MPa | Specific Gravity (ISO 1183) g/cm$^3$ | Tg ° C. | Tm ° C. |
| --- | --- | --- | --- | --- | --- | --- |
| PEEK | Control* | 100 | 45 | 1.31 | 145 | 335 |
| | Test group | 99 | 46 | 1.23 | 152 | 345 |
| PEI | Control* | 105 | 10 | 1.27 | 218 | — |
| | Test group | 104 | 10 | 1.19 | 226 | — |
| ABS | Control* | 32 | 30 | 1.07 | 110 | — |
| | Test group | 32 | 33 | 0.99 | 114 | — |
| PA6 | Control* | 81 | 25 | 1.15 | 50 | 216 |
| | Test group | 79 | 27 | 1.06 | 52 | 219 |
| PET | Control* | 80 | 20 | 1.40 | 69 | 265 |
| | Test group | 78 | 21 | 1.29 | 72 | 269 |

<Change in Physical Properties of Filler-Containing Engineering Plastics>
*As seen in Table 6, the experimental groups containing the filler decreased in specific gravity by about 7-10%, compared to the corresponding control specimens, which were made of 100% by weight of base resins. The composite resins were discovered to have improved heat resistance as measured for Tg and Tm values.

INDUSTRIAL APPLICABILITY

The bio-filler for plastics according to the present disclosure can be produced directly from lignocellulosic biomass at high efficiency and is applicable to products needing light weights and as such, has industrial applicability.

What is claimed is:

1. A method for preparing a bio-filler for a plastic, the method comprising the steps of:
   (a) pulverizing and drying lignocellulosic biomass to form a pulverized and dried lignocellulosic biomass;
   (b) adding a strong acid to the pulverized and dried lignocellulosic biomass to form a reaction mixture;
   (c) adding a base to the reaction mixture to form a neutralized reaction mixture; and
   (d) removing water-soluble substance from the neutralized reaction mixture to form a solid particle, wherein the solid particle is modified lignocellulosic biomass and has a weight of 30% or more based on the pulverized and dried lignocellulosic biomass of step (a).

2. The method of claim 1, wherein the strong acid in step (b) is sulfuric acid, chloric acid, or a mixture thereof.

3. The method of claim 1, wherein the strong acid in step (b) is sulfuric acid having a concentration of 50 to 90% (v/v).

4. The method of claim 1, wherein the lignocellulosic biomass in step (a) comprises lignin and at least one of cellulose and hemicellulose.

5. The method of claim 1, wherein the pulverizing in step (a) is carried out to pulverize the lignocellulosic biomass to a size of 20 mm or less and the drying in step (a) is carried out to dry the lignocellulosic biomass to a moisture content of 30% by weight or less.

6. The method of claim 1, wherein the base in step (c) is selected from sodium hydroxide (NaOH), potassium hydroxide (KOH), calcium hydroxide (Ca(OH)$_2$), ammonia (NH$_3$), lithium hydroxide (LiOH), calcium carbonate (CaCO$_3$), potassium carbonate (K$_2$CO$_3$), sodium carbonate (Na$_2$CO$_3$), potassium hydrogen carbonate (KHCO$_3$), sodium hydrogen carbonate (NaHCO$_3$), and a combination thereof.

7. The method of claim 1, wherein the removal of water-soluble substance in step (d) is carried out by a washing process using an aqueous solution.

8. The method of claim 1, further comprising step (e) of pulverizing the solid particle, after step (d).

9. The method of claim 1, further comprising, subsequent to step (d), step (f) of alkylating the solid particles in step (d) at unreacted hydroxyl and carboxyl groups thereof in order to increase hydrophobicity of the particle or substance.

10. The method of claim 8, wherein the pulverization in step (e) is carried out to finely pulverize the solid particle to an average size of 0.1-100 μm.

11. A bio-filler for a plastic, prepared by the method of claim 1.

12. A plastic material, comprising the bio-filler for a plastic according to claim 11.

13. The plastic material of claim 12, wherein the bio-filler is contained in an amount of 0.1 to 60% by weight, based on the total weight of the plastic.

14. The method of claim 8, further comprising, subsequent to step (d), step (f) of alkylating the solid particles in step (d) or the pulverized solid particle in step (e) at unreacted hydroxyl and carboxyl groups thereof in order to increase hydrophobicity of the particle or substance.

* * * * *